Dec. 25, 1951     M. D. WOOD     2,579,717
LIQUID LEVEL INDICATOR
Filed Dec. 15, 1947
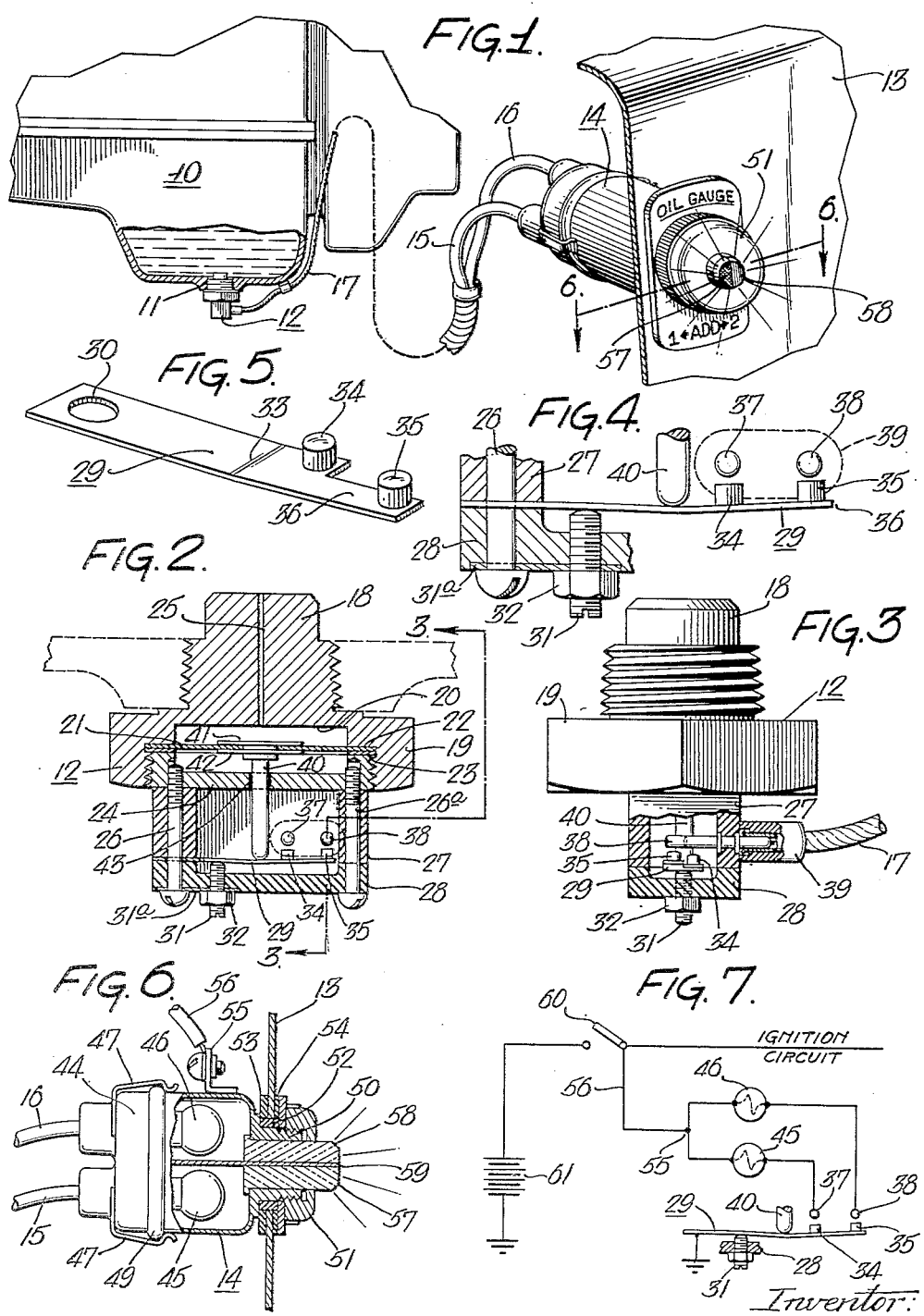
Inventor:
Myron D. Wood
by his Attorneys
Howson & Howson Patented Dec. 25, 1951

2,579,717

UNITED STATES PATENT OFFICE 2,579,717

LIQUID LEVEL INDICATOR

Myron D. Wood, Haddon Heights, N. J.

Application December 15, 1947, Serial No. 791,835

7 Claims. (Cl. 200—83)

This invention relates to liquid level indicators and more particularly to devices for indicating consumption of a liquid such as motor oil and the need for replenishment thereof. While the invention is applicable to indicate consumption of any liquid from a reservoir, it is particularly intended for use in conjunction with the crank case of a motor vehicle and will be described with reference thereto.

Motor vehicles, such as automobiles, are commonly provided with an oil gauge rod which extends into the motor crank case and which is removable to determine the oil level. This requires periodic checking of the oil level which is an inconvenience and annoyance, particularly when the oil consumption is substantial and necessitates frequent checking of the oil level.

Various oil level indicating devices have been proposed in the past but they have been objectionable for various reasons and have never been used to any appreciable extent. In general, such devices have been complicated and expensive and have not been acceptable to automobile manufacturers. Furthermore, they have been of such character as to require their being built into a motor vehicle during manufacture thereof, and therefore they have not been applicable to an existing vehicle.

The principal object of the present invention is to provide a novel and improved liquid level indicator for use in conjunction with a liquid reservoir such as the crank case of a motor vehicle.

Another object of the invention is to provide a simple and efficient oil level indicator which may be installed on a motor vehicle at low cost either during manufacturing or at any time during the life of the vehicle.

Another object of the invention is to provide a device of this general character which, when applied to an existing vehicle, can be mounted on the vehicle very easily and at low cost.

A further object of the invention is to provide a device of this character in the nature of an accessory which can be manufactured at low cost and sold at a correspondingly low price, thus making available to all of the motor public a highly useful and practical oil level indicator which will eliminate much inconvenience and annoyance, and which may prevent serious damage that might otherwise occur due to neglect.

Still another object of the invention is to provide a device which is adapted to replace the usual crank case drain plug, and which is adapted to actuate a simple visual indicator to indicate the oil consumption.

Other objects and features of the invention will be apparent from the following detailed description with reference to the accompanying drawing, wherein Fig. 1 illustrates generally a complete oil consumption indicator provided in accordance with the present invention;

Fig. 2 is a vertical sectional view taken centrally of the oil level responsive device which is employed according to the invention;

Fig. 3 is a view, partly in elevation and partly in section, of the same device, the view being taken along line 3—3 of Fig. 2;

Fig. 4 is an enlarged view of certain elements as shown in Fig. 2, illustrating the switch structure more clearly;

Fig. 5 is a perspective view of the resilient contact arm employed;

Fig. 6 is a view, partly in plan and partly in section, of the indicating device employed, the sectional showing being taken along line 6—6 of Fig. 1; and Fig. 7 is a diagrammatic illustration of the electrical circuit employed in the complete device.

Referring first to Fig. 1, there is represented at 10 the lower portion of the crank case of a motor vehicle, such as an automobile, the drain opening being shown at 11. In accordance with the present invention, the usual drain plug is replaced by an oil level responsive device 12, the structure of which will be described later.

At the right side of Fig. 1, a portion of the instrument panel of said vehicle is represented at 13. A visual indicator device 14 is mounted on said panel and is electrically connected to the device 12 by means of conductors 15 and 16 which preferably are the conductors of a dual conductor cable partially represented at 17. As described more fully hereinafter, the device 14 serves to give two distinctive indications, one when the quantity of crank case oil is one quart below its normal capacity, and the other when the oil quantity is two quarts below the normal capacity.

Referring now to Figs. 2 to 5, which show the preferred construction of the oil level responsive device 12, this device comprises a metal plug-like body 18 which is adapted to be inserted in the threaded drain opening of the motor crank case as illustrated in Fig. 2. The lower nut-like portion 19 is hollowed out to provide a diaphragm chamber 20 which accommodates a flexible and resilient diaphragm 21 which is preferably formed of synthetic rubber. The diaphragm seats against an annular shoulder 22 and is securely held by a washer 23 and the annular upper end of a metallic cup-shaped member 24 which is threadedly inserted into the portion 19. The plug-like body 18 has a centrally-located small orifice or passage 25 which places the diaphragm 21 in communication with the interior of the crank case. Thus, the upper side of the diaphragm is subjected to gravitational pressure of the oil acting through the orifice 25, and since the said pressure is proportional to the quantity of oil in the crank case, the diaphragm 21 is influenced accordingly.

Below member 24, and secured thereto by means of screws 26 and 26a, is a switch casing 27 having a bottom cover 28. Both the casing 27 and its cover 28 are preferably formed of a molded material, e. g. a plastic material. A resilient metal contact arm 29 is arranged within the switch casing as a cantilever, said arm having one end secured or anchored between the casing 27 and its cover at the locality of the left hand screw 26 in Fig. 2, this screw extending through an opening 30 (see Fig. 5) in the arm 29. Near the supported end of said arm, there is provided an adjustable screw 31 which is threaded into the cover 28 and engages arm 29, said screw having an associated lock nut 32. The purpose of this adjustable screw will be explained later. The arm 29 is electrically connected to member 24 through the screw 26. To insure good connection between said arm and said screw, a metal connector or jumper 31a is preferably provided between screw 31 and screw 26.

The arm 29 is slightly bent at 33 so that the free portion of the arm therebeyond is slightly inclined upward, as may be seen in Figs. 2 and 4. A pair of similar contacts 34 and 35 are mounted on the slightly inclined portion of said arm in predetermined spaced relation, the contact 35 being slightly higher than contact 34. As shown in Fig. 5, the portion 36 of said arm between the contacts 34 and 35 is of reduced width. Hence the arm has a relatively stiff portion between its fulcrum end and contact 34, and a more flexible portion between the two contacts. The portion 36 is precisely dimensioned for a reason which will be explained later.

A pair of stationary contacts 37 and 38 are arranged in association with the contacts 34 and 35 for respective engagement thereby. The contacts 37 and 38 are in the form of pins extending through and carried by the wall of casing 27 as shown in Fig. 3. These contact pins are aligned horizontally, that is they are at the same level. The outer ends of these pins are engageable by a dual receptacle plug 39 on the end of the cable 17, the contact pins thus being connected respectively to the two conductors of said cable.

A small rod or pin 40 (see Fig. 2) has its upper end secured to the diaphragm 21 centrally thereof by means of clamping elements or flanges 41 and 42, and said rod extends through an opening 43 in member 24, and its lower end engages the resilient arm 29 substantially at the point 33. The resilience of the arm 29 tends to move it to a position such as to close the above-mentioned contacts. However, the gravitational pressure of the oil acting on the upper face of the diaphragm 21 tends to maintain the arm 29 in a position such that the contacts are not engaged. The arrangement is such that when the quantity of oil in the crank case is substantially at full capacity, i. e. at full level, the arm 29 is maintained at a position such that the contacts are open, as may best be seen in Fig. 4. As the oil is consumed and the downward pressure on arm 29 decreases, the arm moves slightly upward, and, due to the slight incline of the portion 36 of the arm, the contact 35 first engages contact 38. As the oil is further consumed, the portion of the arm carrying contact 34 continues to move upward due to the resilience of the stiff portion of the arm, until said contact engages contact 37. The successive engagements of the two sets of contacts produces distinctive indications by the indicating device 14, as hereinafter described.

It is important to note that when contact 35 engages contact 38, the arm 29 no longer acts as a cantilever since it is effectively fulcrumed at both ends. The portion 36 of the arm then acts as a restraining spring, and by precisely forming this portion so that it has a predetermined resilience, the engagement of contact 34 with contact 37 is caused to follow the engagement of contact 35 with contact 38 in substantially exact accordance with a predetermined quantity of oil consumed after the engagement of contact 35 with contact 38. Preferably, the engagement of contact 34 with contact 37 is caused to occur when one quart of oil has been consumed following the engagement of contact 35 with contact 38. It has been found by experiment that a reduction of one quart of oil in the crank case of any automobile will cause a gravitational pressure difference of about one ounce. By arranging the contacts 34 and 35 so that the tops of these contacts are at levels which are about .020 inch apart, and by forming portion 36 of the arm 29 accordingly, the two contacts are caused to become effective in succesion in response to a pressure difference of one once.

The purpose of the adjustable screw 31 may now be understood. The adjustment of this screw establishes the engagement of contact 35 with contact 38 in relation to the quantity of oil in the crank case, and when properly adjusted it has no effect upon the sequential engagement of the two sets of contacts as above described. Since different automobiles have different crank case capacities, the provision of the screw 31 enables use of the device in the desired manner on any automobile. Since it is desired that contact 35 shall engage contact 38 when the quantity of oil is one quart below "full," the screw 31 should be adjusted so that contact 35 engages contact 38 in response to such quantity of oil. Thus, if the normal capacity of the crank case of a particular automobile is five quarts, the adjustment may be made by putting four quarts of oil in the crank case and then adjusting the screw 31 until contact 35 engages contact 38, as indicated by the indicating device 14.

Referring now to the device 14, this device preferably takes the form shown in Fig. 6. It comprises a metal support 44 for two conventional lamp sockets (not visible). The metal shell of each socket is electrically connected to support 44 by direct engagement therewith, while the center contacts of the sockets are connected to conductors 15 and 16. The sockets accommodate two lamps 45 and 46 which are selectively energized over the conductors 15 and 16. The lamp support 44 carries spring metal fingers 47 by which it is removably attachable to an open-ended metal casing 48 having a bead 49 engageable by said fingers. At its forward portion, the casing 48 has a sleeve-like extension 50 which projects through an opening in panel 13 and which is threaded to receive a nut 51. An insulating collar 52 and insulating washers 53 and 54 serve to insulate the metal casing 48 and its associated nut from the metal panel 13. This is necessary because of the manner in which the electrical circuit is arranged, as described presently. The casing 48 is provided with a connecting lug 55 to which a conductor 56 is connected, the purpose of which will be presently explained.

The sleeve-like portion 50 at the front of casing 48 supports a cylindrical indicator button composed of differently colored semi-cylindrical translucent elements 57 and 58 between which there is an opaque light shield 59 which extends into the casing 48 between the two lamps. The purpose of this is to give distinctively colored visual indications of the need for one or two quarts of oil. Preferably, element 57 is amber, while element 58 is red.

Referring now to the electrical diagram of Fig. 7, the tip contacts of the lamps 45 and 46 are connected respectively to contacts 38 and 37 through conductors 15 and 16. The shell contacts of the lamps are connected through the metal parts 44 and 48 (see Fig. 6) to the common terminal 55, and this terminal is connected by means of conductor 56 to one terminal of the usual ignition switch 60. The contact arm 29 is effectively grounded, as indicated in Fig. 7, by virtue of its being electrically connected to the vehicle crank case (Fig. 2) through the metal parts 18 and 24 of the device 12. Since the vehicle battery, represented at 61, has one terminal grounded and has its other terminal connected to the ignition switch 60, the electrical circuit is completed by virtue of the two ground connections indicated in Fig. 7.

By virtue of the connection of conductor 56 to the ignition side of the switch 60, as shown in Fig. 7, the indicator apparatus is operative only when the ignition switch is closed. Assuming that the ignition switch is closed, when the quantity of oil in the crank case is at or near "full," the contacts 34 and 35 are not in engagement with the contacts 37 and 38, and therefore the circuit is open. When the quantity of oil is one quart less than "full," contact 35 is in engagement with contact 38, as above described, thus completing a circuit for lamp 45. This causes an amber light indication at the left side of the indicator button, as shown in Fig. 1, indicating that one quart of oil should be added. If the quantity of oil in the crank case is permitted to decrease further, when the quantity is two quarts less than "full," contact 34 engages contact 37, as above described, thus energizing lamp 46 and producing a red light indication at the right side of the indicator button, as shown in Fig. 1. This indicates that two quarts of oil should be added.

From the foregoing description, it will be seen that the invention provides a liquid consumption indicator which is particularly applicable to a motor vehicle and may easily be installed thereon. It will be apparent that the installation merely involves insertion of the device 12 in place of the usual oil drain plug, and mounting of the device 14 on the instrument panel. Moreover the complete device is simple in construction and may be manufactured to sell at a low price.

While the invention is particularly applicable to indication of consumption of the motor oil of a motor vehicle, it could be applied in any instance where it is desired to indicate consumption of liquid in a reservoir. Of course, the indications as to consumption will differ in different applications in respect to quantity of the liquid, but this merely involves proper proportioning of the parts of the device and proper design thereof to serve the desired purpose.

In some instances it may be desirable to provide for continuous indication of the liquid level, or the quantity of liquid, in a reservoir from which liquid is being consumed. In such case, the switch of the illustrated device could be replaced by a variable resistor, such as a carbon pile resistor, arranged for actuation by the diaphragm. Thus the lever 29 and the switch contacts would be eliminated, and a carbon pile resistor could be mounted in casing 27 for actuation by rod 40. In such case, the resistor would be connected in an electrical circuit including a source of voltage and an indicator. The circuit might be a simple series circuit, in which case the indicator could be an ammeter to respond to variations of current. Or the indicator might be a voltmeter connected across the variable resistor so as to respond to variations of the voltage drop across the resistor. In either case, the indicator or meter could be graduated in terms of liquid level or quantity of liquid in the reservoir with which the device is used.

Thus, while a particular structural embodiment of the invention has been illustrated and described for the purpose of disclosure, the invention is not limited to such embodiment but is susceptible to modifications and other specific embodiments.

I claim:

1. An oil level responsive device for use on a motor vehicle and adapted to control a pair of indicator means to indicate different oil levels, said device comprising a diaphragm arranged for operation by gravitational pressure of the oil in an oil-containing casing of such vehicle, a cantilever spring contact arm arranged below said diaphragm, means operable by said diaphragm to control movement of said arm according to the quantity of oil in the vehicle crank case, a pair of spaced contacts on said arm, a pair of spaced stationary contacts engageable respectively and successively by the arm contacts upon different amounts of movement of said arm in response to decreasing pressure on said diaphragm, the portion of said arm between said arm contacts being precisely formed to control the successive engagement of the stationary contacts according to a predetermined difference of pressure acting on said diaphragm, and means for adjusting said arm to effect first engagement of a stationary contact by an arm contact when a certain quantity of oil is contained in the vehicle crank case.

2. A liquid level responsive device for use in conjunction with a body of liquid in a reservoir and adapted to control a pair of indicator means to indicate different levels of said liquid, said device comprising a diaphragm arranged for operation by gravitational pressure at the bottom of a liquid reservoir, a rod extending from said diaphragm, a cantilever spring arm engaging said rod and maintaining its engagement with said rod by virtue of the resilience of the arm, the free portion of said arm being slightly inclined toward said diaphragm, a pair of spaced contacts fixedly mounted on said portion of the arm, a pair of spaced stationary contacts engageable respectively and successively by the arm contacts upon different amounts of movement of said arm in response to decreasing pressure on said diaphragm, the portion of said arm between the contacts thereon being of reduced precise cross-section to serve as a restraining spring of predetermined resilience after the outer contacts have engaged one another and during continued movement of said arm to bring the inner contacts into engagement, and manually manipulable means for adjusting said arm to cause engagement of the outer contacts in desired relation to the liquid level in said reservoir.

3. A pressure-operable switch device adapted to control a pair of indicator means to indicate different pressures, comprising a diaphragm arranged for operation by pressure, a cantilever spring arm arranged in spaced relation to said diaphragm, means for effecting movement of said arm under control of said diaphragm, a pair of spaced inner and outer contacts on said arm, a pair of spaced stationary contacts engageable respectively and successively by the arm contacts upon different amounts of movement of said arm in response to varrying pressure on said diaphragm, the outer arm contact engaging the associated stationary contact first, the portion of said arm between the contacts thereon being of reduced precise cross-section to serve as a restraining spring of predetermined resilience after the outer contacts have engaged one another and during continued movement of said arm to bring the inner contacts into engagement, and manually manipulable means for adjusting said arm to cause engagement of the outer contacts when a certain pressure exists on said diaphragm.

4. A pressure-operable switch device adapted to control a pair of indicator means to indicate different pressures, comprising a diaphragm arranged for operation by pressure, a cantilever spring arm arranged in spaced relation to said diaphragm, means for effecting movement of said arm under control of said diaphragm, a pair of spaced inner and outer contacts on said arm, a pair of spaced stationary contacts engageable respectively and successively by the arm contacts upon different amounts of movement of said arm in response to varying pressure on said diaphragm, the outer arm contact engaging the associated stationary contact first, the portion of said arm between its fulcrum point and said inner contact being relatively stiff, and the portion of said arm between the contacts thereon being relatively flexible and serving as a restraining spring of predetermined resilience after the outer contacts have engaged one another and during continued movement of said arm to bring the inner contacts into engagement, and manually manipulable means for adjusting said arm to cause engagement of the outer contacts when a certain pressure exists on said diaphragm.

5. An oil level responsive device for use on a motor vehicle and adapted to control a pair of indicator means to indicate different oil levels, said device comprising a diaphragm arranged for operation by gravitational pressure of the oil in an oil-containing casing of such vehicle, a cantilever spring arm arranged below said diaphragm, means operable by said diaphragm to control movement of said arm according to the quantity of oil in the said casing, a pair of spaced inner and outer contacts on said arm, a pair of spaced stationary contacts engageable respectively and successively by the arm contacts upon different amounts of movement of said arm in response to varying pressure on said diaphragm, the outer arm contact engaging the associated stationary contact first, the portion of said arm between its fulcrum point and said inner contact being relatively stiff, and the portion of said arm between the contacts thereon being relatively flexible and serving as a restraining spring of predetermined resilience after the outer contacts have engaged one another and during continued movement of said arm to bring the inner contacts into engagement, whereby to control the successive engagement of the stationary contacts according to a predetermined difference of pressure acting on said diaphragm, and manually manipulable means for adjusting said arm to cause engagement of the outer contacts when a certain quantity of oil is contained in the said casing.

6. A device according to claim 5, including a plug-like body adapted to be inserted in place of the drain plug of an oil-containing casing of the vehicle, said body having an orifice through which said diaphragm is in communication with said casing.

7. A device according to claim 6, including a diaphragm chamber and a casing therebelow in which the spring arm and contacts are disposed.

MYRON D. WOOD.

REFERENCES CITED

The following references are of record in the file of this patent:

UNITED STATES PATENTS

| Number | Name | Date |
|---|---|---|
| 1,280,222 | Hester | Oct. 1, 1918 |
| 1,387,746 | Webb | Aug. 16, 1921 |
| 1,914,105 | Bletz | June 13, 1933 |
| 1,918,265 | Hartwig | July 18, 1933 |
| 2,182,450 | Clarkson | Dec. 5, 1939 |
| 2,230,113 | Hein | Jan. 28, 1941 |
| 2,238,071 | Nazar | Apr. 15, 1941 |
| 2,266,144 | Baak | Dec. 16, 1941 |
| 2,305,154 | Gilbert | Dec. 15, 1942 |
| 2,341,931 | Lloyd | Feb. 15, 1944 |
| 2,345,023 | Yarbrough et al. | Mar. 28, 1944 |
| 2,355,975 | Henrici | Aug. 15, 1944 |

FOREIGN PATENTS

| Number | Country | Date |
|---|---|---|
| 546,261 | Great Britain | July 3, 1942 |